May 28, 1963 J. W. YOWELL ET AL 3,091,280
CORRUGATED TUBING
Original Filed Feb. 28, 1957 2 Sheets-Sheet 1
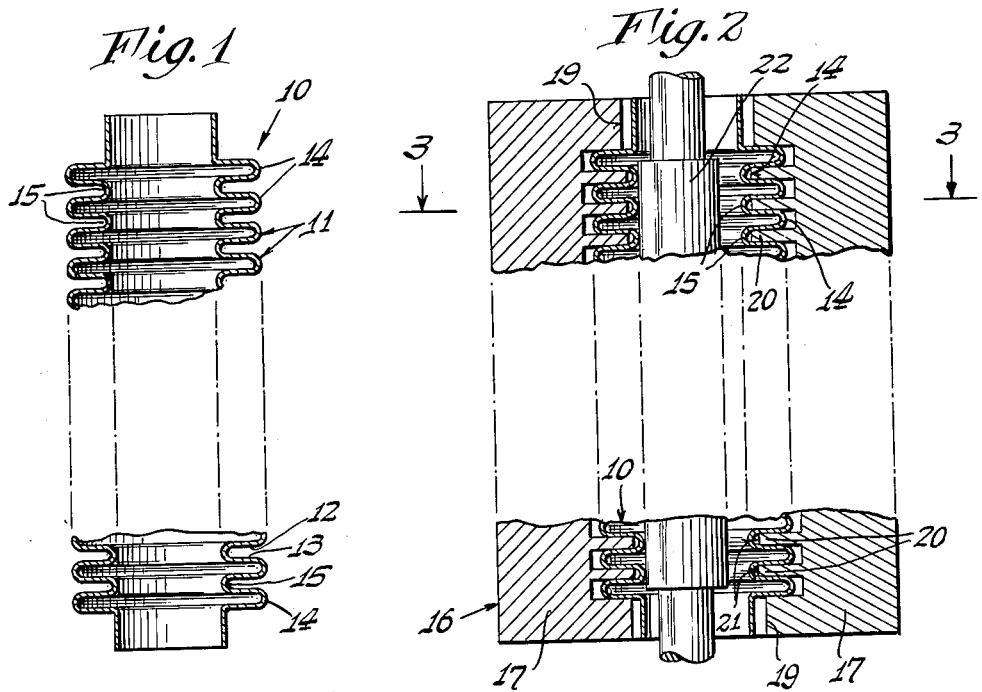
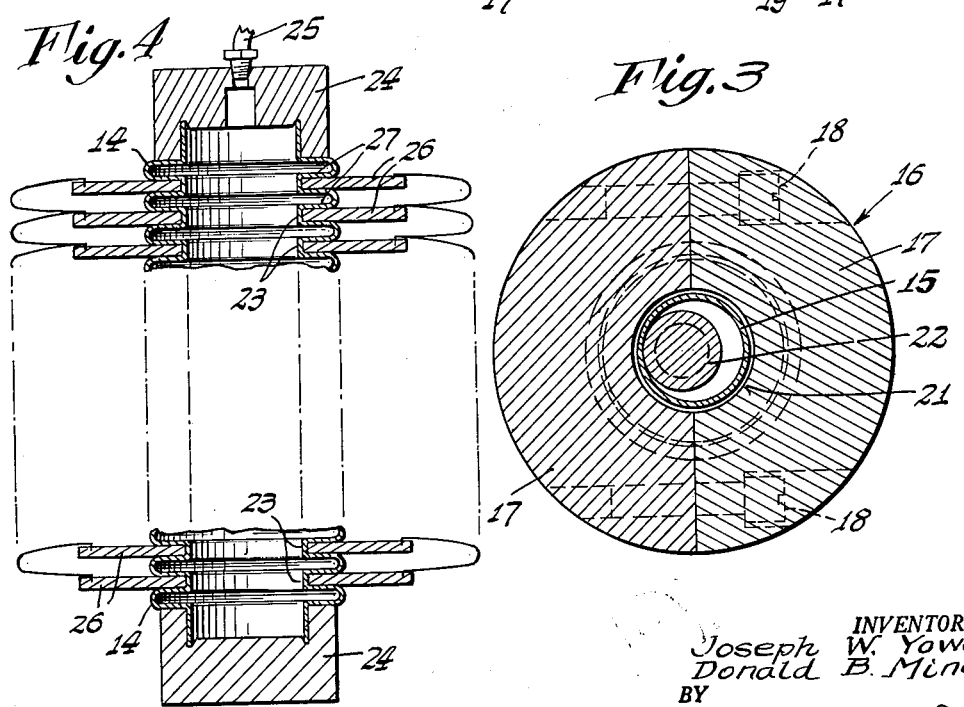
INVENTORS
Joseph W. Yowell
Donald B. Miner
BY
Johnson and Kline
ATTORNEYS May 28, 1963 J. W. YOWELL ETAL 3,091,280
CORRUGATED TUBING
Original Filed Feb. 28, 1957 2 Sheets-Sheet 2
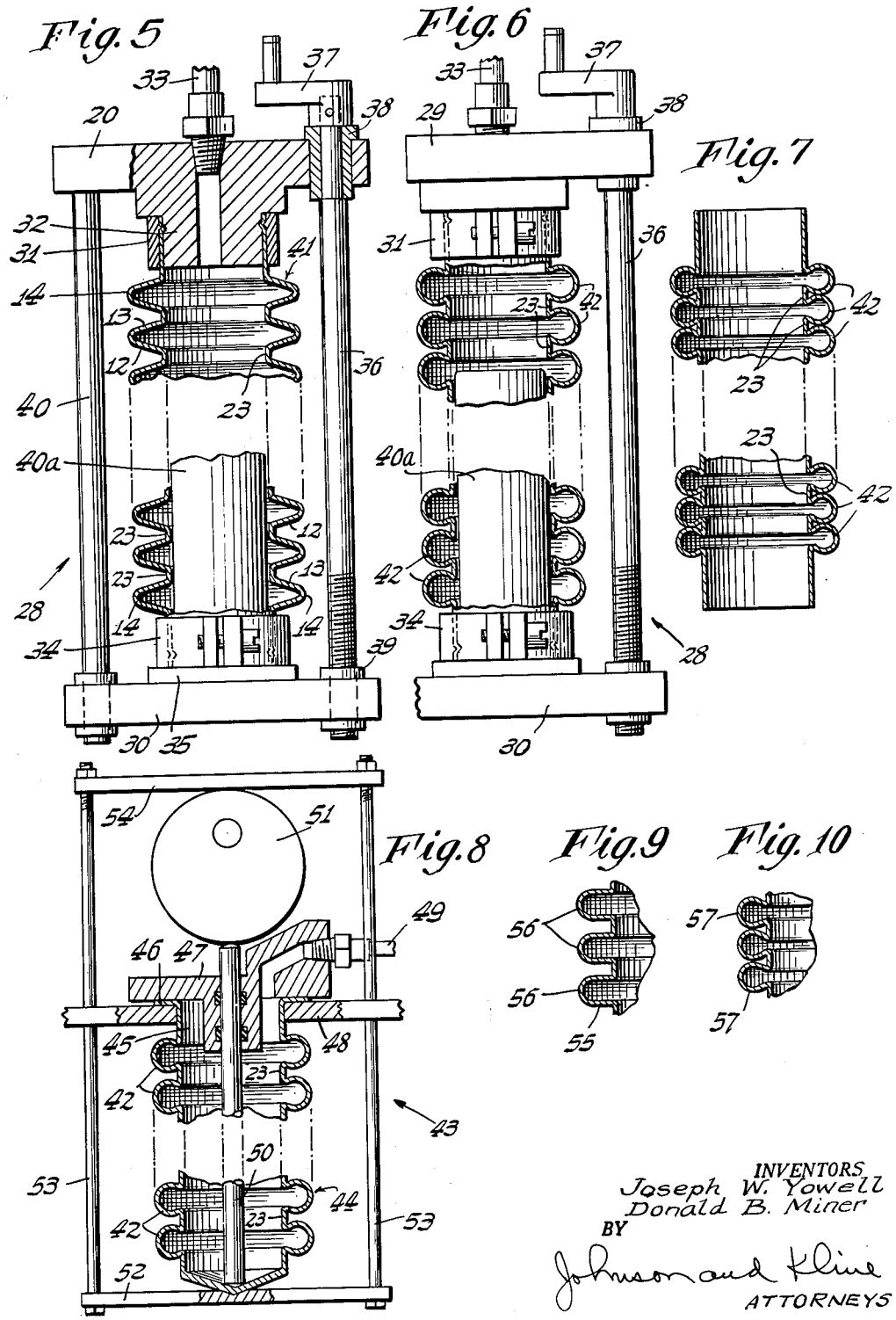
INVENTORS
Joseph W. Yowell
Donald B. Miner
BY
Johnson and Kline
ATTORNEYS United States Patent Office 3,091,280
Patented May 28, 1963

3,091,280
CORRUGATED TUBING
Joseph W. Yowell, Hillspoint Road, Westport, Conn., and Donald B. Miner, Orange Center Road, Orange, Conn.
Original application Feb. 28, 1957, Ser. No. 643,055, now Patent No. 3,019,820, dated Feb. 6, 1962. Divided and this application May 15, 1961, Ser. No. 110,164
6 Claims. (Cl. 153—73)

The present invention relates to tubing and more particularly to flexible metal tubing having annular corrugations and to the method of forming such tubing.

The present invention is a division of applicants' copending application Serial No. 643,055, filed February 28, 1957, and entitled "Corrugated Tubing," now Patent No. 3,019,820, granted February 6, 1962.

Tubing of the present class includes tubing of indefinite length which has both ends open and tubing having at least one end closed. The latter construction is more specifically referred to as a bellows. The corrugations in the tubing enable the tubing to be flexible or easily bent without restriction of the passageway at the corrugated portion while a bellows changes its length in accordance with variations in pressure and is thus generally utilized to provide for the translation of hydraulic pressure into mechanical movement or vice versa. It is to be expressly understood that the word "tubing" as used throughout the specification and claims includes both open-ended tubing and the type of tubing specifically referred to as "bellows."

It is an object of the present invention to provide metal corrugated tubing which is so organized and arranged that it can withstand internal pressure greatly in excess of those considered limiting for tubing of similar size.

Another object of the present invention is to provide corrugated tubing which has a greater flexibility without being deformed than heretofore possible and when such tubing is used as an internal bellows, has a greater sensitivity than any presently known devices.

A further object of the present invention is to provide for a method of economically fabricating annular corrugated tubing as set forth above and in which the tubing produced thereby is simple and compact in construction.

A feature of the present invention utilized to attain the above objects resides in a method of reworking a conventional annular corrugated tubing to form the corrugations thereof into annular portions whose cross-sections have geometric shapes that have the greatest resistance to deformation caused by internal pressure. The reworking method involves both hydraulic and mechanical operations and causes the corrugations of a conventional bellows to be formed into the desired geometric cross-sectional shapes. Tubing constructed according to this method provides for corrugations which have one portion whose shape is in the form of a straight line and thus forms a hoop or annular ring and another annular portion having a cross-sectional shape which is substantially circular or C-shaped. The two portions joined together constitute one complete corrugation. In addition, the latter cross-sectional shape is also the geometric shape which provides the maximum deflection without deformation by reason of it distributing the flexing stress over a uniform convolute shape. Thus, the internal pressure tubing of the instant invention not only provides for maximum resistance to deformation and rupture by internal pressure but also provides for a more flexible tubing.

Other features and advantages will hereinafter appear.

In the drawing:
FIGURE 1 is an axial section of conventional corrugated tubing.
FIG. 2 is an axial section illustrating the first step of one method of reworking the conventional tubing.
FIG. 3 is a cross-sectional view taken on the line 3—3 of FIG. 2.
FIG. 4 is an axial section showing the first step of another method of performing the first step for making the tubing.
FIG. 5 is a view partly in section showing the next operation of reworking the tubing.
FIG. 6 is similar to FIG. 5 and illustrating a further step of reworking the tubing.
FIG. 7 is an axial section of corrugated tubing made according to the present invention in its relaxed or free condition.
FIG. 8 is a view partly in section illustrating a device in which bellows having the desired corrugation configuration may be formed.
FIG. 9 is a partial sectional view of another length of tubing prior to reworking.
FIG. 10 is a partial sectional view showing the cross-section configuration of the corrugations of the tubing of FIG. 9 after being reworked.

Referring to the drawing, a conventional corrugated tubing is illustrated in FIG. 1 and generally indicated by the reference numeral 10. This tubing is typical of presently made corrugated tubing and may be hydroformed from a length of circular tubing in a manner such as disclosed in U.S. Patent No. 1,946,472, granted February 13, 1934. The corrugated tubing 10 has a plurality of annular corrugations 11 with each corrugation including upper and lower flat, spaced portions 12 and 13 respectively, outer semicircular connecting portions 14 and inner semicircular connecting portions 15. The flat surfaces 12 and 13 are coaxial, lying generally in equispaced radial planes, and are axially aligned. The connecting portions 14 and 15 are also aligned. The portions 12 to 15 inclusive by being hydroformed each have substantially the same wall thickness which corresponds to that of the wall thickness of the tube from which they were formed.

The conventional tubing 10, in the first step of reworking it to form tubing according to the present invention, is placed in a jig 16 composed of separable semi-cylindrical sections 17 maintained together by bolts 18. The jig 16 has an axial bore 19 and circular radial protrusions 20. The protrusions 20 are spaced such that they conform to the exterior surface of the conventional tubing 10. However, the interior periphery of each of the protrusions 20 is flat, as indicated at 21, to enable the formation of a straight sided axial portion by reworking the semicircular connecting portions 15. To this end, a mandrel 22 is positioned inside the tubing 10. The mandrel 22 is smaller than the inner diameter of the tubing 10 and accordingly is mounted on an axis eccentric to but parallel to the axis of the tubing 10. The mandrel 22 is caused to rotate about its axis and press against the interior surfaces of the portions 15 to cause them to be flattened against the flat portions 21 of the jig 16. This produces annular innermost connecting portions having a straight line cross-section and these portions are indicated by the reference numeral 23 in FIGS. 4 to 8, inclusive.

Shown in FIG. 4 is another method by which the flat interconnecting portions 23 may be formed. In this figure, a length of tubing is initially set up in a hydraulic fixture 24 which permits internal fluid pressure to be introduced in the tubing by way of conduit 25. Rings 26 are equally spaced along the length of tubing and each have a flat inner periphery 27 which, upon introduction of fluid pressure into the tubing and collapsing of the rings 26 together, cause the flat portions 23 to be formed. The method and means used herein is the same as that in the previously mentioned Patent No. 1,946,472 with the exception that the rings 26 have a flat inner periphery 27. This method is performed on a length of uncorrugated tubing and the thickness of the portions 23 is maintained substantially the same as the wall thickness of the tubing.

Upon the completion of the mechanical operation shown in FIGS. 2 and 3 or the hydraulic, mechanical operation shown in FIG. 4, the tubing having flats 23 is placed in a device 28 shown in FIGS. 5 and 6. This device 28 is designed to mechanically stretch or elongate the tubing and also control the length thereof during the introduction, maintenance and release of internal fluid pressure. The device 82 has upper and lower bases 29 and 30 respectively to which the ends of the tubing are connected. The connection may be any of the well-known types which provide a fluid tight joint and also a mechanical clamping action. In the illustrated embodiment, the upper base 29 includes a clamping ring 31 and a plug 32. The plug 32 has a conduit 33 for permitting the introduction of fluid for causing the internal pressure. The lower base 30 similarly has a clamping ring 34 and a plug 35. The two bases are mounted for movement toward and away from each other and, accordingly, there is provided a threaded rod 36, having a handle 37, extending through a bushing 38 in the upper base and threaded bushing 39 in the lower base. In addition there is provided a supporting rod 40 having its upper end fixed to the upper base and its lower end slidably mounted in the lower base. Accordingly, upon rotation of the handle 37 the length of the tubing may be mechanically altered and upon cessation of movement the length of the tube is mechanically maintained at its set length.

After performing the operation shown in either FIGS. 2 and 3 or FIG. 4, the tube having flat portions 23 is fixed in the device 28 and the tube is lengthened by turning the handle so that the flat spaced coaxial portions 12 and 13 become radially outwardly converging and the corrugations assume the cross-sectional shape indicated by the reference numeral 41. After this stretching operation, the tubing is maintained at its stretched condition and hydraulic pressure is introduced into the tube. This pressure is sufficient to cause the straight portions 12 and 13 of the tube in FIG. 5 to be deformed by being ballooned out and joining with the portion 14 to form a substantially circular cross-sectional shape as indicated by the reference numeral 42 in FIG. 6. During the hydraulic deforming operation, the tubing is axially compressed by turning the handle 37 to allow the ballooning of the portions 12 and 13 and prevent thinning of the wall thickness of these portions. This produces a length of corrugated tubing which is shown in FIG. 7 in its relaxed or free condition.

At times, with long lengths of tubing, it is advisable to utilize a support in the tubing to maintain the corrugations in axial alignment during the axial compressing. This may be accomplished by a tube 40a which is merely placed within the corrugated tubing and rests on the lower base.

The tubing as shown is one piece and has corrugated walls. The walls have inner portions comprising flat annular bands 23 with each band constituting a section of a cylinder. Each band is aligned and coaxial with the other bands. Integral with and interconnecting the bands and disposed outwardly thereof are annular portions 42 which are substantially circular in cross-section. The portion 42 normally extends through an arc materially greater than 180 degrees and the angle between the bands and the portions is materially less than 90 degrees. By reason of such shaped corrugations, the tubing is able to withstand greater internal pressure without deformation or rupture than tubing of similar size having conventional corrugations. It will be apparent that the bands 23 by themselves are capable of withstanding high internal pressure without deformation while the substantially circular portions 42 already have assumed the shape to which excessive internal pressure would naturally deform them. In addition, the portions 42 have a cross-sectional shape which acts like a C ring which permits a greater axial expansion or flexibility of the tubing than in tubing having conventional corrugations. Though the tubing is shown corrugated over almost its entire length, in practice only the length of tubing which is required to be flexible will be corrugated.

Shown in FIG. 8 is a device 43 for performing the same operations as that described in connection with FIGS. 5 and 6. However, this device 43 is used for reworking the corrugations of a conventional closed end bellows 44. To this end, the open end 45 of the bellows has a flange 46 which is clamped between a plug 47 and a seat 48 to cause a fluid tight seal. The plug 47 includes a conduit 49 for introducing pressure into the bellows 44 and in addition a rod 50 for stretching the bellows. The rod 50 is actuated in the illustrated embodiment by a cam 51. To provide positive control over the length of the bellows, a platform 52 contacts the exterior of the closed end of the bellows. The platform is connected by rods 53 to a cam follower 54 which rides in the cam 51. Thus, rotation of the cam enables both elongation and shortening of the bellows. The reworking operations on the bellows shown in FIG. 8 are the same as that recited heretofore in connection with FIGS. 5 and 6. The corrugations produced have the same configuration as shown in FIG. 7.

The tubing shown in FIG. 9 differs from that shown in FIGS. 2, 3 and 4 by having shorter radially flat portions 55 and arcuate portions 56 formed on a larger radius. After performing the method set forth above, the result is in the tubing shown in FIG. 10 which has substantially circular, cross-sectional portions 57. The radius of the arcuate portions 56 and the radius of the circular portions 57 are substantially the same. Accordingly in performing the above method, there is eliminated the step of initially stretching the tubing. Thus the tubing in FIG. 9 is subjected to deforming internal pressure and mechanically contracted to form the tubing having the corrugations shown in FIG. 10.

While it is desired to maintain the annular portion 23 flat or having a straight line cross-sectional shape, at times with certain dimensions of the corrugations, wall thickness and deforming pressure, the flat portion 23 will be bowed inwardly a very slight amount. However this characteristic is not detrimental to the capability of the tubing of the present invention to withstand internal pressure and the words "flat" or straight-line sectional shape as used throughout the disclosure and claims is intended to include this structure.

From the foregoing it will be appreciated that there has been set forth a method for making corrugated tubing. The tubing produced by the method has a greatly increased resistance to deformation caused by internal pressure than heretofore possible and in addition thereto the corrugations provide increased flexibility for bending of the tubing and increased sensitivity when utilized in bellows. Moreover, by reason of the shape of the corrugations, thinner wall corrugated tubing may be employed than is now normally used for the same internal pressures with the result that increased resistance to fatigue or failure is effectuated.

Variations and modifications may be made within the scope of the claims and portions of the improvements may be used without others.

We claim:

1. The method of forming internal pressure corrugated tubing from a tubing which has corrugated side walls having a plurality of flat, spaced, coaxial portions lying generally in equispaced radial planes and inner and outer connector portions connecting together said flat portions, with the inner connector portions being substantially flat and the outer portions circular, which includes the steps of elongating the tubing to cause the flat spaced portions to be radially inwardly diverging; subjecting the interior of said corrugated walls of the tubing to a fluid pressure sufficient to permanently curve outward the said diverging flat portions of the walls and cause said permanently curved portions to constitute substantially continuations of the curves of the outer circular connector portions and simultaneously contracting the tubing.

2. The method of forming internal pressure corrugated tubing from a length of circular tubing comprising the steps of subjecting the interior of the tubing to a pressure to bulge outwardly the walls thereof while restraining axial sections of the tubing to form corrugated side walls having a plurality of flat, spaced, coaxial portions lying generally in equispaced radial planes and inner and outer connector portions connecting together said flat portions; flattening the inner connector portions to form cylindrical sections; elongating the tubing to cause the flat, spaced portions to be inwardly diverging; and subjecting the interior of said tubing to a fluid pressure and simultaneously contracting the tubing, said pressure being sufficient to permanently curve outward the said flat, spaced portions of the walls and cause said permanently curved portions to constitute substantially continuations of the curves of the outer circular connector portions.

3. The invention as defined in claim 2 in which the flattening of the inner connector portions is accomplished simultaneously with the forming of the flat spaced portions and the outer connector portions.

4. The invention as defined in claim 2 in which the flattening of the inner connector portions is effectuated by mechanically compressing the inner connector portions against flat annular surfaces.

5. The invention as defined in claim 2 in which the flattening of the inner connector portions is effectuated by subjecting the interior of the tubing to a pressure to cause the inner connector portions to be bulged out and restraining the bulges by flat annular surfaces.

6. The method of forming an internal pressure corrugated tubing from a conventional tubing which has corrugated side walls having a plurality of flat, spaced, coaxial portions lying generally in equispaced radial planes and inner and outer circular connector portions connecting together said flat portions, which includes the steps of flattening the inner circular connector portions of the tubing into cylindrical sections; elongating the tubing to cause the flat spaced portions to be radially inwardly diverging; and simultaneously subjecting the interior of said corrugated walls of the tubing to a fluid pressure and contracting the tubing, said pressure being sufficient to permanently curve outward the said radial portions of the walls and cause said permanently curved portions to constitute substantially continuations of the curves of the outer circular connector portions.

References Cited in the file of this patent

UNITED STATES PATENTS

| 1,879,663 | Dreyer | Sept. 27, 1932 |
| 2,699,959 | Zallea | Jan. 18, 1955 |
| 2,822,194 | Fentress | Feb. 4, 1958 |
| 2,887,146 | Hesterman | May 19, 1959 |

FOREIGN PATENTS

| 276,247 | Great Britain | Aug. 25, 1927 |